Oct. 1, 1929.  A. SMALLWOOD  1,729,910
CLAMP FOR STRUCTURAL TUBES, BARS, AND THE LIKE
Filed Nov. 29, 1924
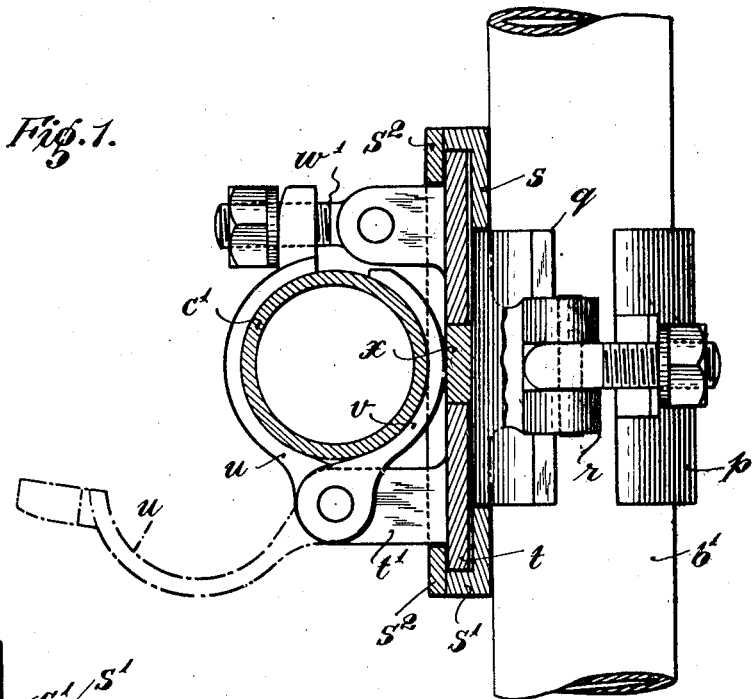
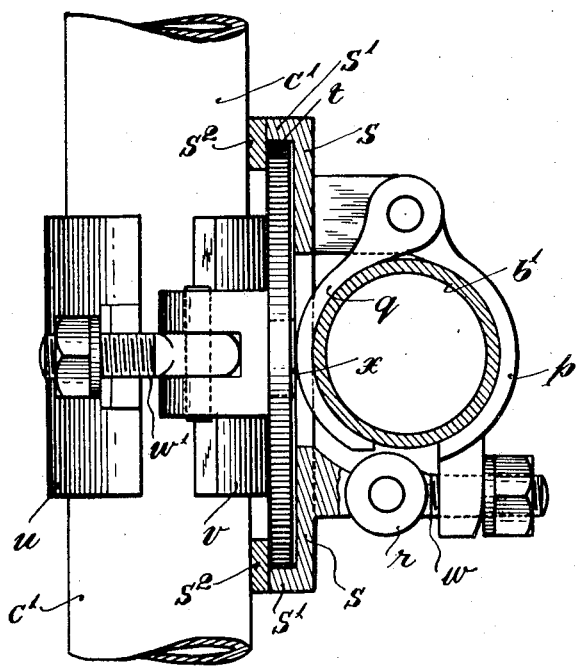

Patented Oct. 1, 1929

1,729,910

UNITED STATES PATENT OFFICE

ALFRED SMALLWOOD, OF SMETHWICK, ENGLAND

CLAMP FOR STRUCTURAL TUBES, BARS, AND THE LIKE

Application filed November 29, 1924, Serial No. 752,920, and in Great Britain December 22, 1923.

This invention comprises certain improvements in or relating to structural metal work, and it is concerned particularly with the erection of structures in a short space of time at a low cost, and in a manner such as to obtain rigidity, durability and strength, and generally the conditions necessary for the rapid erection of every kind of structure which may be composed of lengths of metal secured detachably together for convenience in transit and installation.

While for instance this invention is particularly applicable in the erection of scaffolding, it is equally applicable in the erection of buildings such for instance as necessitate a frame-work of metal to constitute a support for wood-work, canvas or the like, and this invention has for its object to facilitate and quicken the process of erection and disassemblage.

While this invention is particularly adapted for the assemblage of tubular members, it is applicable for the assemblage for other members such as metal lengths of angle, channel, U—, or other shapes in transverse section, and primarily the present invention comprehends a clamping element for securing together two or more tubes or equivalent members in parallel or angular relationship.

The present invention comprehends clamping provision for securing together two tubes, bars or the like in a manner such that the said tubes, bars or the like may be secured in alignment, in parallelism, in transverse relationship, or in any intermediate angular relationship.

In accordance with my invention I employ dual clamping devices swivelled together, one of which is adapted to grip one of the tubes or members and the other, the other of the tubes or members, in manner such that the desired universal angular adjustment is permitted, and in this embodiment the arrangement may be such that the clamping device appertaining to one tubular member may be rotated indefinitely in relation to that appertaining to the other tubular member. Each tubular member is adapted individually to be gripped as against longitudinal or angular derangement, while one or both of the clamping devices is utilized to apply the gripping effort necessary to retain the tubes in parallelism or in the desired angular relationship. In this construction each of the clamping elements may comprehend two substantially semi-circular or segmental members, one of which may, when in an open position, form a rest for the horizontal tube or member in the process of assemblage.

In order that this invention may be clearly understood and readily carried into practice, reference may be had to the drawings on which Figure 1 is a sectional elevation of a clamp forming a practical embodiment of the present invention.

Figure 2 is a sectional plan of the same.

As shown in the drawings the vertical tube $b^1$ is embraced by a clamp consisting of substantially semi-circular limb $p$ pivoted co-axially with a limb $q$ upon a bearing $r$ carried by a disc $s$ which is flanged at $s^1$ and fitted with an annulus $s^2$ appropriately secured to enclose rotatably a disc $t$ carrying the bearing $t^1$ of a similar clamp consisting of an arm $u$ pivoted co-axially with another arm $v$. The limbs $p$ $q$ and $u$ $v$ of the respective clamps are adapted to be drawn together and in relation to their respective discs $s$ $t$ in the clamping action by swivelled tightening members $w$ $w^1$, so that the tubes $b^1$, $c^1$, are thereby gripped and in order to provide for the retention of the tubes in any angular relationship a plug $x$ is incorporated in the disc $t$ and adapted to be capable of movement axially therein so that the tightening of the member $w$ appertaining to the clamp $p$ $q$ has the result that the member $q$ bears upon this plug and the latter in turn bears upon the limb $v$ of the clamp appertaining to the tube $c^1$ so that the respective clamps and the tubes held thereby are appropriately secured in the desired angular relationship or in parallelism.

It will be noted that the limb $v$ in connection with the plug $x$ and limb $q$ comprise in effect means for transferring stress from the clamping arm $u$ and tube $c$ to the disc $t$ so that when said arm $u$ is in clamping position as shown in full lines and under the stress of the tightening bolt $w^1$, said disc $t$ is frictionally held with force against the annulus $s^2$ so that relative rotation between the discs $s$, $t$ which form the bases of the two clamping devices is prevented, and thereby the tubes are held in any desired adjusted position either parallel or at any angle to each other.

In connection with the limb $u$ appertaining to the clamp which carries the horizontal tube I advantageously incorporate stop provision whereby when this clamp is opened this limb assumes the position indicated in dotted lines so that it thereby forms a rest for the tube $c^1$ in the process of assemblage.

Having described my invention, what I claim and desire to secure by Letters Patent is:—

Clamping apparatus of the class described, comprising a pair of base members swivelly connected together for relative annular movement and each provided with means to bear against one side of a work piece, each base member also having a pivotally mounted clamping arm to engage the outer side of a work piece and locking, adjusting and tensioning means for said clamping arm so that the clamping arms of the respective base members are operable each independently of the other and so that stress is transferred from the clamping arm and work piece of one of the base members through the swivelling connection to the other base member and said base members are hence frictionally secured against relative angular movement when said clamping arms are in direct clamping position.

In witness whereof I affix my signature.

ALFRED SMALLWOOD.